United States Patent
Roussellet et al.

(10) Patent No.: US 12,413,387 B2
(45) Date of Patent: Sep. 9, 2025

(54) METHOD FOR SECURING AN AES BLOCK CIPHER ALGORITHM AGAINST HIGH-ORDER SIDE-CHANNEL ATTACKS

(71) Applicant: THALES DIS FRANCE SAS, Meudon (FR)

(72) Inventors: Mylène Roussellet, Saint Savournin (FR); David Vigilant, Malakoff (FR); Olivier Adjonyo Koffi Benit, Rosny-sous-bois (FR)

(73) Assignee: THALES DIS FRANCE SAS, Meudon (FR)

( * ) Notice: Subject to any disclaimer, the term of this patent is extended or adjusted under 35 U.S.C. 154(b) by 183 days.

(21) Appl. No.: 18/265,980

(22) PCT Filed: Dec. 14, 2021

(86) PCT No.: PCT/EP2021/085654
§ 371 (c)(1),
(2) Date: Jun. 8, 2023

(87) PCT Pub. No.: WO2022/129024
PCT Pub. Date: Jun. 23, 2022

(65) Prior Publication Data
US 2024/0031130 A1    Jan. 25, 2024

(30) Foreign Application Priority Data
Dec. 14, 2020  (EP) ..................... 20306556

(51) Int. Cl.
*H04L 9/06* (2006.01)
*H04L 9/00* (2022.01)

(52) U.S. Cl.
CPC ............ *H04L 9/0631* (2013.01); *H04L 9/003* (2013.01)

(58) Field of Classification Search
CPC . H04L 9/0631; H04L 9/003; H04L 2209/043; H04L 2209/08; H04L 2209/46
See application file for complete search history.

(56) References Cited

U.S. PATENT DOCUMENTS 9,306,739 B1 * 4/2016 Troupe .................. H04L 9/0858
9,559,838 B2 * 1/2017 Genelle .................. H04L 9/004
(Continued)

FOREIGN PATENT DOCUMENTS

EP    2296307 A1    3/2011
EP    2530867 A1    12/2012

OTHER PUBLICATIONS

Fumaroli et al.; "Ane Masking against Higher-Order Side Channel Analysis", 2010, SAC, pp. 1-25. (Year: 2016).*

(Continued)

*Primary Examiner* — Matthew Smithers

(57) ABSTRACT

Provided is a method for securing against high-order side-channel attacks wherein a substep of field inversion is performed by a cryptographic device. The method includes computing (S1) a Dirac output value, adding (S2) said Dirac output value to one of said shares of the first set of shares to obtain a second set of shares, performing a conversion of the second set of shares (S3) from said (n+1) additive sharing to a (n+1)-multiplicative sharing, performing an inversion of each share of the (n+1)-multiplicative sharing (S4), performing a conversion of the inverted shares (S5) from said multiplicative sharing to a (n+1)-additive sharing to obtain a third set of shares, and adding (S6) said Dirac output value to one of said shares of the third set of shares. Other embodiments disclosed.

6 Claims, 4 Drawing Sheets

(56) References Cited

U.S. PATENT DOCUMENTS

| | | | | |
|---|---|---|---|---|
| 10,025,926 | B2* | 7/2018 | Walters | G06F 21/556 |
| 10,567,162 | B2* | 2/2020 | Wang | G06F 9/30029 |
| 2011/0013769 | A1* | 1/2011 | Itoh | H04L 9/003 |
| | | | | 380/28 |
| 2014/0169553 | A1* | 6/2014 | Chen | G06F 7/726 |
| | | | | 380/28 |
| 2017/0373837 | A1* | 12/2017 | Gagnerot | H04L 9/003 |
| 2018/0183576 | A1* | 6/2018 | Wang | H04L 9/0631 |

OTHER PUBLICATIONS

Shvartsman et al.; "Side Channel Attack Resistant AES Design Based on Finite Field Construction Variation", 2019, IEEE International Workshop on Signal Processing Systems, pp. 67-72. (Year: 2019).*

Ai et al.; "Variational Mode Decomposition Based Denoising in Side Channel Attacks", 2016 2nd IEEE International Conference on Computer and Communications, pp. 1683-1687. (Year: 2016).*

Fumaroli et al.; "Ane Masking against Higher-Order Side Channel Analysis", 2010, SAC, pp. 1-25. (Year: 2015).*

Genelle et al.; "Thwarting Higher-Order Side Channel Analysis with Additive and Multiplicative Maskings Extended Version", 2011, Springer, International Workshop on Cryptographic Hardware and Embedded Systems, pp. 1-20. (Year: 2011).*

International Search Report (PCT/ISA/220) and Written Opinion (PCT/ISA/237) mailed on Apr. 7, 2022, by the European Patent Office as the International Searching Authority for current International Application No. PCT/EP2021/085654—[15 pages].

XP047309615—Genelle Laurie et al.—Sep. 28, 2011 section 3 and in particular 3.2; diagram p. 245 Relevant to claim No. 1,2,9-11.

XP047545212—Landry Simon et al—Mar. 2, 2020 section 3.1 Relevant to claim No. 3.

* cited by examiner

METHOD FOR SECURING AN AES BLOCK CIPHER ALGORITHM AGAINST HIGH-ORDER SIDE-CHANNEL ATTACKS

FIELD

The present invention relates to the field of block cipher encryption, and more particularly to a method for securing against high-order side-channel attacks an execution of the SubBytes step of a block cipher algorithm based on Advanced Encryption Standard (AES) by secret sharing of the internal state of the cryptographic algorithm.

BACKGROUND

Cryptographic algorithms are commonly used for ensuring the privacy of communications by encryption, for authentication or for generating a verifiable signature. An example of such algorithms is block cipher algorithms such as AES, in which input bits of data to be encrypted or decrypted are processed by blocks. Cipher block algorithms often perform encryption or decryption by applying several encryption or decryption rounds on an internal state x.

Such cryptographic algorithms are sensitive to side-channel attacks, based on an analysis of the power consumption or electromagnetic signature of the device performing the encryption, as depicted on FIG. 1. A particular type of side-channel attack is Differential Power Analysis (DPA) that performs a statistical analysis of the power consumption on several encryption rounds in order to recover at least some part of the secret key used for the encryption.

A commonly used countermeasure against side-channel attacks such as DPA is to perform a secret sharing of the internal state of such cryptographic algorithms. Using such a secret sharing, the internal state is represented by (n+1) shares xi with i an integer in {0, 1, 2, ... n}, with n an integer, such that the internal state can be retrieved from all the shares. By doing so, the internal state itself is never manipulated and the cryptographic algorithm is protected against side channel analysis of order n. Such a sharing may for example be a Boolean sharing (x=x0 XOR x1 XOR ... XOR xn) or multiplicative sharing (x=x0*x1* ... *xn).

Most AES algorithm steps consist in linear operations which are compatible with Boolean sharing. Indeed AddRoundKey is a XOR, ShifRrow is just a reordering of the bytes, and MixColumn is composed of multiplications and additions in GF(256). Nevertheless, the SubBytes step can be seen as the composition of an affine transformation in $GF(2^8)$ with an inversion in GF(256)*, which is not easily compatible with a Boolean masking.

However, such an inversion is easily compatible with multiplicative masking. Indeed Assuming x=x0*x1* ... *xn in GF(256)*, then 1/x=(1/x0)*(1/x1)* ... *(1/xn).

Nevertheless, applying an inversion on a value masked using a multiplicative sharing raises an issue when x=0. In such a case, at the inversion step of SubBytes, the internal state must be mapped to 0 instead of being inversed. Such a particular treatment of the value x=0 would allow an attacker to guess when x=0, and then to recover the value of the secret key used for the AES operation.

In order to avoid such a weakness, it has been proposed in the publication of Genelle et al entitled "Secure Multiplicative Masking of Power Functions", ACNS 2010: 200-217 to use a function Delta_0 defined such that Delta_0 (x)=1 if x=0, Delta_0 (x)=0 otherwise. Before performing the inversion of each share of the internal state, the internal state x in GF(256) is mapped to x+Delta_0 (x), which is equal to 1 when x=0 and equal to x otherwise. It ensures that no share is ever equal to zero and therefore that all shares may be inversed without any specific treatment when x=0. Additionally the paper proposes a solution to compute Delta_0 in the presence of $1^{st}$ order masking. Nevertheless, this implementation proposed for Delta_0 function is not efficient, especially for computing systems with a low amount of available RAM memory. Indeed the described solution requires a RAM table from 32 bits to 256 bits storing x+Delta_0(x) for an x masked at first order. This table would have to be recomputed when modifying the mask value.

Another method was proposed later in Genelle et al.'s "Montgomery's Trick and Fast Implementation of Masked AES", Africacrypt 2011: 163-179. This proposition considered high order masking without the necessity of storing a RAM table. Instead, the authors introduced a way of computing the Dirac function on the fly. However it needed to inject fresh randomness in order to ensure the completeness inside, as it operates and mix corresponding shares together. The drawback of this solution can be the performance.

Therefore, the invention proposes an efficient alternative to Genelle et al.'s "Montgomery's Trick and Fast Implementation of Masked AES", Africacrypt 2011: 163-179. It gives a solution for secure Dirac implementation in the context of an AES with multiplicative masking and secured against high-order side-channel attacks.

SUMMARY

For this purpose and according to a first aspect, this invention therefore relates to a method for securing against high-order side-channel attacks an execution of a SubBytes step of a block cipher algorithm based on Advanced Encryption Standard and operating on an internal state x split into a first set of (n+1) shares (x0, x1, x2 ... xn) by a (n+1)-additive sharing, with n a non-zero integer, said SubBytes step comprising: a substep of affine transformation in $GF(2^8)$ on the state x and a substep of a field inversion in GF(256)*, wherein said substep of field inversion is performed by a cryptographic device and comprises:

computing a Dirac output value by executing at least one Dirac function on a plurality of shares xi of the internal state x, with i an integer in [0,n], said Dirac function being a function defined in GF(256) such that said Dirac output value is equal to 1 when x equals 0 and is equal to 0 otherwise, adding said Dirac output value to one of said shares of the first set of shares to obtain a second set of shares, performing a conversion of the second set of shares from said (n+1) additive sharing to a (n+1)-multiplicative sharing, performing an inversion of each share of the (n+1)-multiplicative sharing, performing a conversion of the inverted shares from said multiplicative sharing to a (n+1)-additive sharing to obtain a third set of shares, adding said Dirac output value to one of said shares of the third set of shares.

The method according to the first aspect may comprise previously computing and storing in a Non-Volatile Memory the Dirac function implemented as at least one precomputed table, and the step of computing the Dirac output value may comprise performing a lookup in said at least one precomputed table implementing said Dirac function.

Such a method enables to decrease the computational cost of the algorithm at the time of its execution by performing most of the calculation related to the Dirac function far before the execution.

In a first embodiment, the step of computing the Dirac output value comprises:
- replacing one of said shares xi of the internal state x, with i an integer in [0,n], by its binary complementary ~xi with ~ the Boolean negation operation,
- executing the Dirac function Delta_0 by computing: Delta_0 (x)=[x00 ^ . . . ^xn0] & [x01 ^ . . . ^ xn1] & [x02 ^ . . . ^ xn2] & [x03 ^ . . . ^ xn3] & [x04 ^ . . . ^ xn4] & [x05 ^ . . . ^ xn5] & [x06 ^ . . . ^ xn6] & [x07 ^ . . . ^ xn7] with ^ the Boolean disjunction XOR operation and & the Boolean conjunction AND operation, and wherein xij denotes the j-th bit of the share xi, with i an integer in {0, 1, . . . n} and j in {0, 1, . . . 7}.

Such an embodiment enables to compute the Dirac function on all the shares at once, and therefore reduces to a minimum the number of calls to functions for computing the Dirac output value.

In a second embodiment, the step of computing the Dirac output value comprises:
- replacing one of the shares xi by its binary complementary ~xi with i an integer in {0, 1, . . . n} and ~ the Boolean negation operation, and
- performing a XOR between (n+1) binary values, each of said binary values being computed by performing a Boolean conjunction AND operation & between a plurality of bits of said shares having different indexes in said shares, with XOR the Boolean exclusive disjunction operation.

In such a second embodiment, the step of computing the Dirac output value may comprise computing Delta_0(x)= XOR(xA0 & xB1& xC2 & xD3& xE4 & xF5& xG6 & xH7), for all possible combinations of A, B, C, D, E, F, G, H in {0, 1, 2, . . . n} with & the Boolean conjunction AND operation.

In such a second embodiment, the step of computing the Dirac output value may comprise:
- executing a first Dirac function Delta_0_0 on the shares of the internal state x such that: Delta_0_0(x)=XOR(xA0 & xB1& xC2 & xD3), for all possible combinations of A, B, C, D in {0, 1, . . . , n},
- executing a second Dirac function Delta_0'_1 on the shares of the internal state x such that: Delta_0_1(x)= XOR(xA4 & xB5& xC6 & xD7), for all possible combinations of A, B, C, D in {0, 1, . . . , n},
- performing a Boolean conjunction AND operation & between the results of the execution of the first Dirac function and of the second Dirac function Delta_0_0(x) & Delta_0_1(x).

In such a second embodiment, the step of computing the Dirac output value may comprise:
- executing a first Dirac function Delta_0_00 on the shares of the internal state x such that: Delta_0_00(x)=XOR (xA0 & xB1), for all possible combinations of A, B in {0, 1, . . . , n}
- executing a second Dirac function Delta_0_01 on the shares of the internal state x such that: Delta_0_01(x)= XOR(xC2 & xD3), for all possible combinations of C, D in {0, 1, . . . , n}
- executing a third Dirac function Delta_0_10 on the shares of the internal state x such that: Delta_0_10(x)=XOR (xA4 & xB5), for all possible combinations of A, B in {0, 1, . . . , n}
- executing a fourth Dirac function Delta_0_11 on the shares of the internal state x such that: Delta_0_11(x)= XOR(xC6 & xD7), for all possible combinations of C, D in {0, 1, . . . , n}
- performing a Boolean conjunction AND operation & between the results of the execution of the first Dirac function, of the second Dirac function, of the third Dirac function and of the fourth Dirac function: Delta_0(x)=Delta_0_00(x) & Delta_0_01(x) & Delta_0_10(x) & Delta_0_11(x).

Such a second embodiment brings more security since it doesn't ever reconstructs any bit of the internal state. The different proposed variants are different solutions to find a tradeoff between the size of the precomputed tables and the number of lookup to be performed for computing the Dirac output value.

In an embodiment, the method according to the first aspect:
- comprises previously: computing and storing in a Non Volatile Memory for each Dirac function to be executed, two binary complemented versions (Mi0', Mi1') of the precomputed table implementing said Dirac function (Delta_0_i), said binary complemented versions of the precomputed table being said precomputed table masked with either 0 or 1,
- and the step of executing a Dirac function on the shares of the internal state x comprises performing a lookup in one of said two binary complemented versions of the precomputed table implementing said function depending on a random mask bit.

Such an embodiment enables to increase the security by masking the precomputed tables implementing the Dirac functions.

According to a second aspect, this invention therefore relates also to a computer program product directly loadable into the memory of at least one computer, comprising software code instructions for performing the steps of the method according to the first aspect when said product is run on the computer.

According to a third aspect, this invention therefore relates also to a non-transitory computer readable medium storing executable computer code that when executed by a cryptographic device comprising a processing system having at least one hardware processor performs the method according to the first aspect.

According to a fourth aspect, this invention therefore relates also to a cryptographic device comprising:
- a processing system having at least one hardware processor configured to execute the steps of the method according to the first aspect,
- at least one Non Volatile Memory and/or a read-only memory configured for storing precomputed tables.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

The invention aims at providing a method for securing against high-order side-channel attacks an execution of a SubBytes step of a block cipher algorithm based on Advanced Encryption Standard. Such a method may be performed by a cryptographic device 101.

Figure 1:
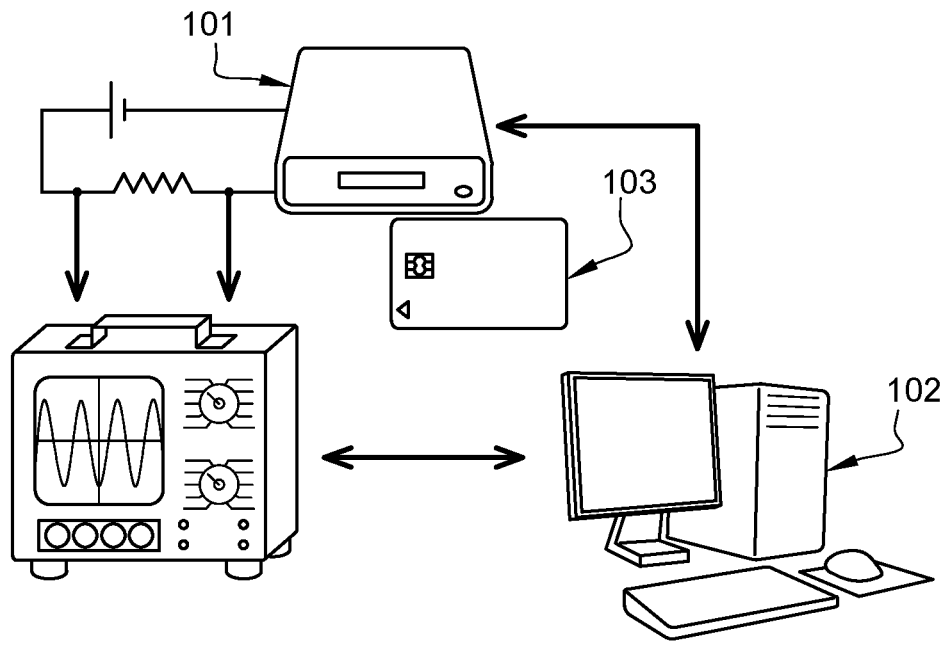
FIG. 1 is a schematic illustration of a system according to an embodiment of the present invention and a high-order side-channel attack on this system.

As depicted on FIG. 1, such a cryptographic device 101 may be connected to a personal computer or server 102 operated by a user and sending commands to the cryptographic device for cryptographic operations such as data encryption or decryption using the block cipher algorithm based on the Advanced Encryption Standard (AES) algorithm. Alternatively, the cryptographic device 101 may be embedded in the computer 102.

The cryptographic device 101 may include a tamper resistant device 103 secured against any unauthorized access including a processing system having at least one hardware processor for performing cryptographic operations, and a computer readable memory circuit configured for storing the data needed for such operations. Such a cryptographic device may for example be a smartcard reader housing a smartcard device, or an electronic device, such as a smartphone, including a smartchip.

Figure 2:
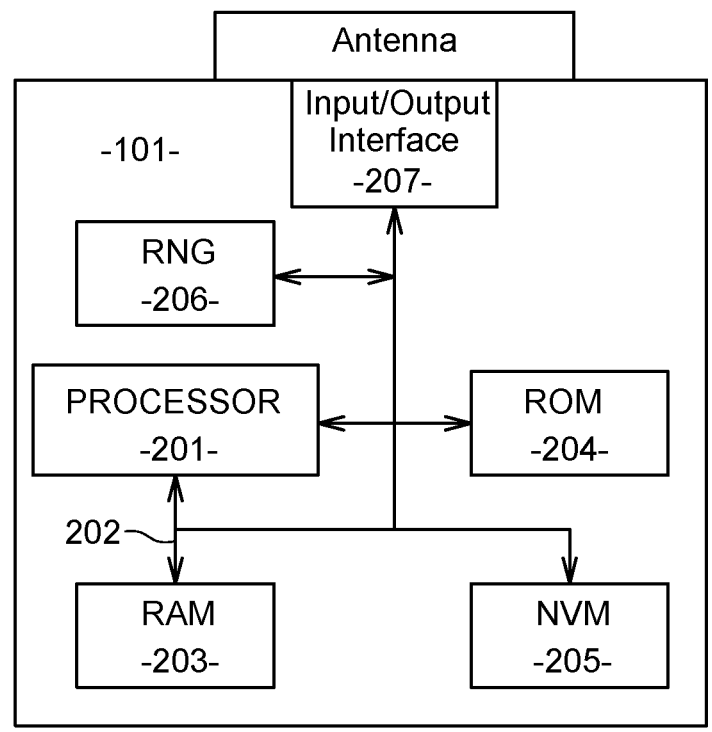
FIG. 2 is a schematic illustration of a cryptographic device according to an embodiment of the present invention.

FIG. 2 is a schematic illustration of the cryptographic device 101. The cryptographic device 101 may include a processing system 201 having at least one hardware processor, connected via a bus 202 to a computer readable memory circuit including a random access memory (RAM) 203, a read-only memory (ROM) 204, and/or a non-volatile memory (NVM) 205. The cryptographic device 101 may also include a random number generator (RNG) 206, included in the hardware processor or connected to it via the bus. The cryptographic device 101 may further include an interface 207 used to connect the cryptographic device 101 to the computer 102. Such an interface may be either a wired interface such as a USB, Ethernet or Thunderbolt interface, or a wireless interface, such as a Bluetooth interface. The interface 207 may also be used to connect the cryptographic device 101 to a wireless network, e.g., wide-area networks, WiFi networks, or mobile telephony networks through which communication may be performed with the computer 102.

Figure 3:
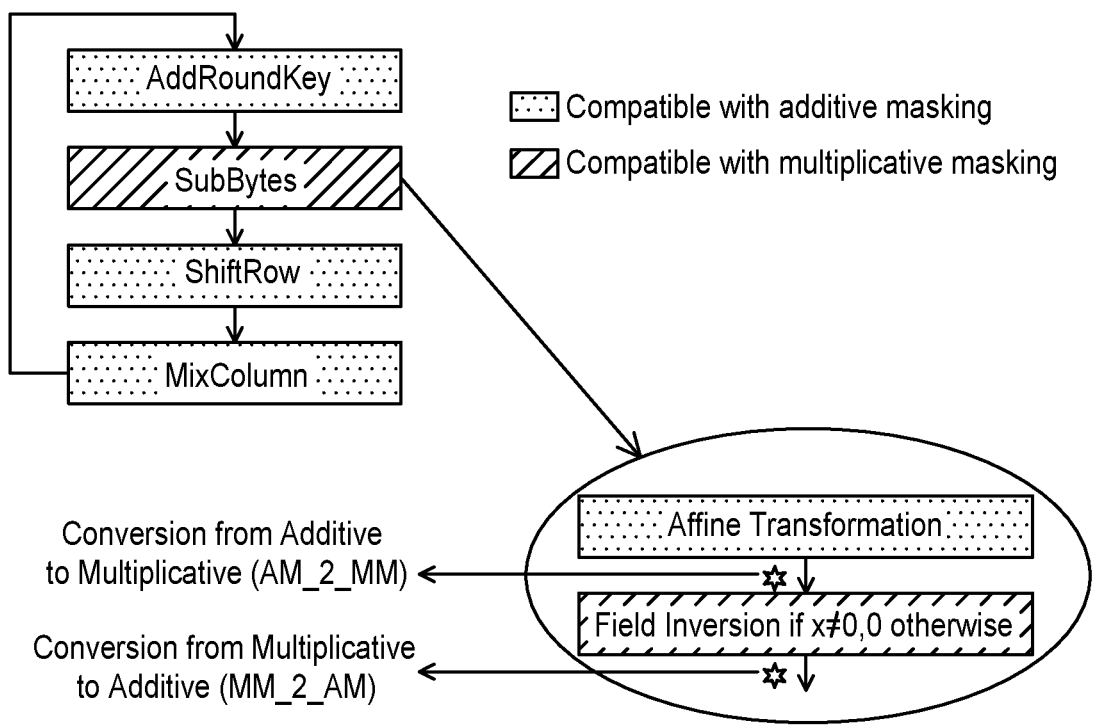
FIG. 3 is a schematic illustration of masking by splitting of the internal state x during all steps of the AES algorithm.

The following paragraphs describe the steps of a method for securing against n-order side-channel attacks, with n a predetermined integer, a cryptographic process according to AES performed by the cryptographic device 101 according to a first aspect of the invention. As shown on FIG. 3, it is supposed that the internal state x is masked by splitting during all steps of the AES algorithm:

during AddRoundKey step, ShiftRow step, Mixcolumn step and the affine transformation substep of SubBytes step, the internal state x is supposed to be masked by a (n+1)-additive splitting such that the internal state is split into a first set of (n+1) shares x0, x1, x2, . . . , xn such that x=x0 ^ x1 ^x2 ^. . . ^ xn with ^ the Boolean exclusive disjunction XOR operation, during the substep of field inversion in GF(256)*the internal state x is supposed to be masked by a (n+1)-multiplicative splitting such that the internal state is split into (n+1) shares x'0, x'1, x'2, . . . , x'n such that x=x'0*x'1*x'2* . . . *x'n.

Figure 4:
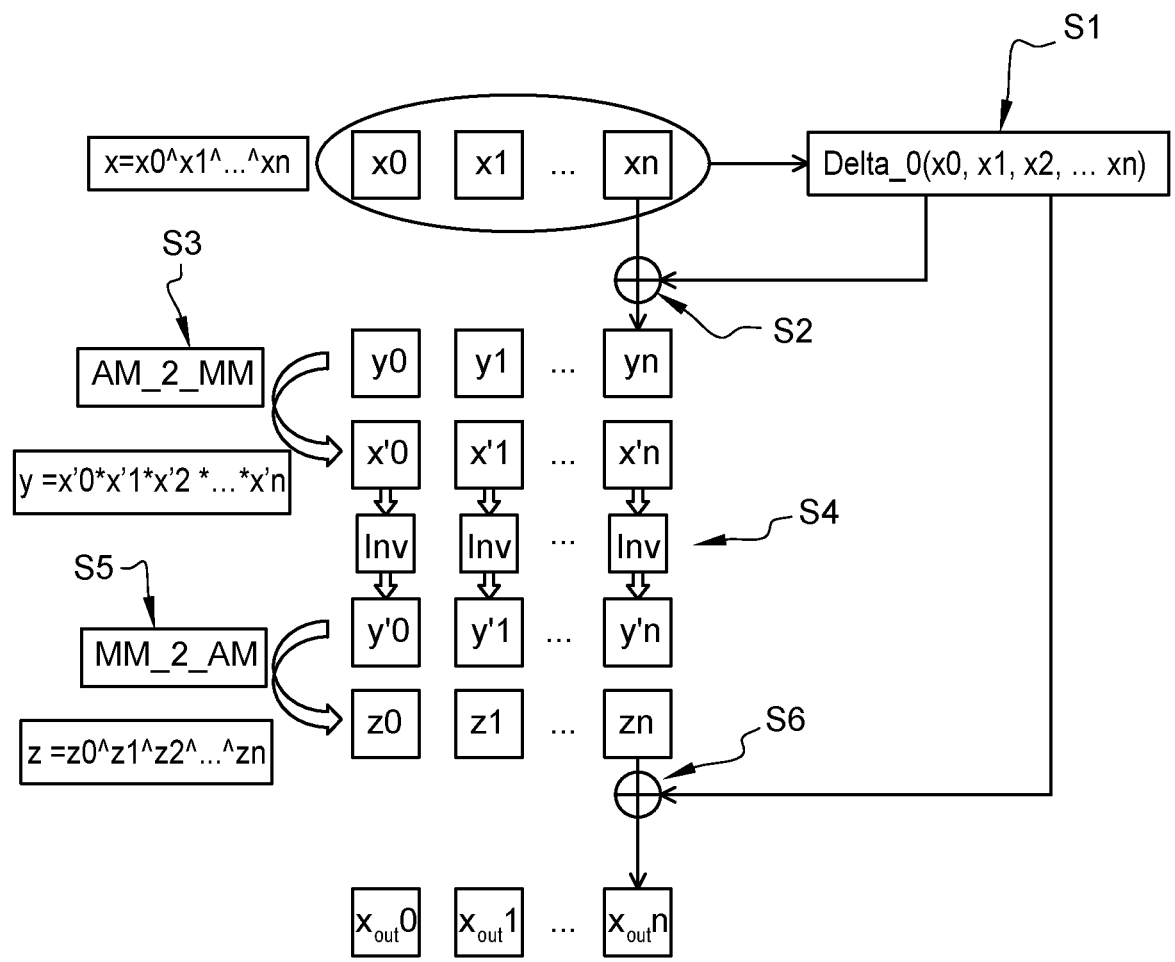
FIG. 4 illustrates schematically a method of securing against n-order side-channel attacks according to an embodiment of the present invention.

The following paragraphs describe actions performed by the cryptographic device during the substep of field inversion, as shown on FIG. 4.

In a first step S1, the cryptographic device computes a Dirac output value by executing at least one Dirac function xi of the internal state x, with i an integer in [0,n]. The sought Dirac output value is the value Delta_0(x) that would be provided by the Delta_0 function described above. Said Dirac function is a function defined in GF(256) such that the Dirac output value is equal to 1 when the internal state x equals 0 and such that the Dirac output value is equal to 0 otherwise. As shown in the examples of implementation provided hereafter, executing said Dirac function on a plurality of shares may either provide directly the value Delta_0(x) or another value further used to compute the value Delta_0(x). By doing so, the value Delta_0(x) may be computed without calling the Delta_0 function defined above independently for each share of the internal state, which is much more efficient than what has been proposed in existing implementations.

In a second step S2, the cryptographic device adds the Dirac output value to one of the shares of the first set of shares (x0, . . . , xn) to obtain a second set of shares (y0, . . . , yn). As a result of this addition, the value y= y0 ^. . . ^ yn is never equal to 0.

In a third step S3, the cryptographic device performs a conversion of the second set of shares from said (n+1)-additive sharing to a (n+1)-multiplicative sharing x'0, x'1, x'2, . . . , x'n, such that y=x'0*x'1*x'2* . . . *x'n. Since y is never equal to 0, none of the shares x'0, x'1, x'2, . . . , x'n can be equal to zero.

In a fourth step S4, the cryptographic device performs an inversion of each share of the (n+1)-multiplicative sharing.

In a fifth step S5, the cryptographic device performs a conversion of the inverted shares from said multiplicative sharing to a (n+1)-additive sharing to obtain a third set of shares z0, . . . , zn.

In a sixth step S6, in order to obtain the value of the internal state at the end of the SubBytes step—let us note it x_out—the cryptographic device adds the Dirac output value computed in the first step to one of the shares of the third set of shares z0, . . . , zn. By doing so, the Dirac output value, which was added to the shares in the second step S2 before the inversion, is removed from the shares. Therefore x_out=z0 ^. . . ^(zn+Delta_0(x)), with the assumption that Dirac output value is added to zn for illustrative purpose.

The following paragraphs describe multiple example of implementation of the first step S1 during which the Dirac output value is computed. This value shall be equal to Delta_0(x)=($\sim x_0$) & ($\sim x_1$) & ($\sim x_2$) & ($\sim x_3$) & ($\sim x_4$) & ($\sim x_5$) & ($\sim x_6$) & ($\sim x_7$), where $x_i$ denotes de i-th bit of the internal state x, $\sim$ the binary complementary and & the logical and. Moreover, each bit can be expressed as a XOR between the bits of the same index in all the shares: $x_i$=x0$_i$ ^ x1$_i$^. . . ^ xn$_i$ which means that ($\sim x_i$)=($\sim$x0$_i$) ^ x1$_i$^. . . ^ xn$_i$, with i=0, 1, . . . , 7.

Therefore, in a first example of implementation, the first step S1 may first comprise replacing one of said shares xi of the internal state x, with i an integer in [0,n], by its binary complementary $\sim$xi. Then, the first step may comprise executing the Dirac function Delta_0 by computing: Delta_0 $(x)=[x0_0 \wedge \ldots \wedge xn_0] \& [x0_1 \wedge \ldots \wedge xn_1] \& [x0_2 \wedge \ldots \wedge xn_2] \& [x0_3 \wedge \ldots \wedge xn_3] \& [x0_4 \wedge \ldots \wedge xn_4] \& [x0_5 \wedge \ldots \wedge xn_5] \& [x0_6 \wedge \ldots \wedge xn_6] \& [x0_7 \wedge \ldots \wedge xn_7]$ with $\wedge$ the Boolean disjunction XOR operation and & the Boolean conjunction AND operation, and wherein $xi_j$ denotes the j-th bit of the share xi, with i an integer in $\{0, 1, \ldots n\}$ and j in $\{0, 1, \ldots 7\}$.

In such an implementation, the Dirac output value is computed by performing a XOR between all the shares one bit after the other. Such an implementation enables to compute the Dirac output value in a single calculation from all the bits but it is not very secure since it exposes the complementary of each bit of the internal state as an intermediate calculation.

Alternatively, the first step S1 may also first comprise replacing one of said shares xi of the internal state x, with i an integer in [0,n], by its binary complementary ~xi. But then, the first step may comprise performing a XOR between (n+1) binary values, each of said binary values being computed by performing a Boolean conjunction AND operation & between a plurality of bits of said shares having different indexes in said shares, with XOR the Boolean exclusive disjunction operation. In such implementations, there is no computation of any value combining bits located at the same index of different share. Therefore no information about the internal state is leaked.

Since each share is a byte, it is made of 8 bits at indexes $\{0, 1, \ldots 7\}$. In a second example of implementation, each binary value is computed by performing a Boolean conjunction AND operation & between 8 bits each located at a different index among the 8 possible indexes $\{0, 1, \ldots 7\}$: Delta_0$(x)$=XOR$(xA_0 \& xB_1 \& xC_2 \& xD_3 \& xE_4 \& xF_5 \& xG_6 \& xH_7)$, for all possible combinations of A, B, C, D, E, F, G, H in $\{0, 1, \ldots n\}$ with & the Boolean conjunction AND operation.

Precomputed lookup tables (LUT) may be precomputed for such Dirac functions and stored in the read-only memory (ROM) 204, and/or a non-volatile memory (NVM) 205 of the cryptographic device. The step of computing the Dirac output value may then comprise performing a lookup in said precomputed table implementing said Dirac function.

Nevertheless, such precomputed LUT become very large as the number of shares (n+1) increases. Therefore, other examples of implementation are proposed which enable to reduce the size of LUTs to be stored.

In a third example of implementation, after replacing one of said shares xi of the internal state x, with i an integer in [0,n], by its binary complementary ~xi, the first step may comprise:
  executing a first Dirac function Delta_0_0 on the shares of the internal state x such that: Delta_0_0$(x)$=XOR$(xA_0 \& xB_1 \& xC_2 \& xD_3)$, for all possible combinations of A, B, C, D in $\{0, 1, \ldots, n\}$,
  executing a second Dirac function Delta_0_1 on the shares of the internal state x such that: Delta_0_1$(x)$=XOR$(xA_4 \& xB_5 \& xC_6 \& xD_7)$, for all possible combinations of A, B, C, D in $\{0, 1, \ldots, n\}$,
  performing a Boolean conjunction AND operation & between the results of the execution of the first Dirac function and of the second Dirac function Delta_0_0$(x)$ & Delta_0_1$(x)$.

In such an example, a first subfunction Delta_0_0 performs the same kind of calculation than the function Delta0 in the second example of implementation, but this time only on the four first bits of the shares; and then a second subfunction Delta_0_1 performs the same calculation on the remaining four other bits of the shares. By doing so, the precomputed tables implementing such subfunctions are much smaller than the precomputed table implementing the full Delta0 function.

In a fourth example of implementation, four subfunctions may be used, each one dealing only with the bits of the shares located at two indexes. For example in such an embodiment after replacing one of said shares xi of the internal state x, with i an integer in [0,n], by its binary complementary ~xi, the first step may comprise:
  executing a first Dirac function Delta_0_00 on the shares of the internal state x such that: Delta_0_00$(x)$=XOR$(xA_0 \& xB_1)$, for all possible combinations of A, B in $\{0, 1, \ldots, n\}$,
  executing a second Dirac function Delta_0_01 on the shares of the internal state x such that: Delta_0_01$(x)$= XOR$(xC_2 \& xD_3)$, for all possible combinations of C, D in $\{0, 1, \ldots, n\}$,
  executing a third Dirac function Delta_0_10 on the shares of the internal state x such that: Delta_0_10$(x)$=XOR$(xA_4 \& xB_5)$, for all possible combinations of A, B in $\{0, 1, \ldots, n\}$,
  executing a fourth Dirac function Delta_0_11 on the shares of the internal state x such that: Delta_0_11$(x)$= XOR$(xC_6 \& xD_7)$, for all possible combinations of C, D in $\{0, 1, \ldots, n\}$,
  performing a Boolean conjunction AND operation & between the results of the execution of the first Dirac function, of the second Dirac function, of the third Dirac function and of the fourth Dirac function: Delta_0$(x)$=Delta_0_00$(x)$ & Delta_0_01$(x)$ & Delta_0_10$(x)$ & Delta_0_11$(x)$.

The following paragraph gives an example where n=2 (three shares) and the third example of implementation is used, using two Dirac function Delta_0_0$(x)$ & Delta_0_1$(x)$ to compute the Dirac output value Delta_0$(x)$.

In such an example, x=x0 $\wedge$ x1 $\wedge$ x2 with
x0=$(x0_0, x0_1, x0_2, x0_3, x0_4, x0_5, x0_6, x0_7)$
x1=$(x1_0, x1_1, x1_2, x1_3, x1_4, x1_5, x1_6, x1_7)$
x2=$(x2_0, x2_1, x2_2, x2_3, x2_4, x2_5, x2_6, x2_7)$
Delta_0$(x)$=Delta_0_0$(x)$ & Delta_0_1$(x)$ with
Delta_0_0$(x)$=XOR$(xA_0 \& xB_1 \& xC_2 \& xD_3)$ and
Delta_0_1$(x)$=XOR$(xA_4 \& xB_5 \& xC_6 \& xD_7)$,
for all possible combinations of A, B, C, D in $\{0, 1, 2\}$.
Finally, Delta_0$(x)$=
$((x0_0 \& x0_1 \& x0_2 \& x0_3)\wedge(x0_0 \& x0_1 \& x0_2 \& x1_3)\wedge(x0_0 \& x0_1 \& x0_2 \& x2_3) \wedge(x0_0 \& x0_1 \& x1_2 \& x0_3)\wedge(x0_0 \& x0_1 \& x1_2 \& x1_3)\wedge(x0_0 \& x0_1 \& x1_2 \& x2_3) \wedge(x0_0 \& x0_1 \& x2_2 \& x0_3)\wedge(x0_0 \& x0_1 \& x2_2 \& x1_3)\wedge(x0_0 \& x0_1 \& x2_2 \& x2_3) \wedge(x0_0 \& x1_1 \& x0_2 \& x0_3)\wedge(x0_0 \& x1_1 \& x0_2 \& x1_3)\wedge(x0_0 \& x1_1 \& x0_2 \& x2_3) \wedge(x0_0 \& x1_1 \& x1_2 \& x0_3)\wedge(x0_0 \& x1_1 \& x1_2 \& x1_3)\wedge(x0_0 \& x1_1 \& x1_2 \& x2_3) \wedge(x0_0 \& x1_1 \& x2_2 \& x0_3)\wedge(x0_0 \& x1_1 \& x2_2 \& x1_3)\wedge(x0_0 \& x1_1 \& x2_2 \& x2_3) \wedge(x0_0 \& x2_1 \& x0_2 \& x0_3)\wedge(x0_0 \& x2_1 \& x0_2 \& x1_3)\wedge(x0_0 \& x2_1 \& x0_2 \& x2_3) \wedge(x0 \& x2_1 \& x1_2 \& x0_3)\wedge(x0_0 \& x2_1 \& x1_2 \& x1_3)\wedge(x0 \& x2_1 \& x1_2 \& x2_3) \wedge(x0_0 \& x2_1 \& x2_2 \& x0_3)\wedge(x0_0 \& x2_1 \& x2_2 \& x1_3)\wedge(x0_0 \& x2_1 \& x2_2 \& x2_3) \wedge(x1_0 \& x0_1 \& x0_2 \& x0_3)\wedge(x1_0 \& x0_1 \& x0_2 \& x1_3)\wedge(x1_0 \& x0_1 \& x0_2 \& x2_3) \wedge(x1_0 \& x0_1 \& x1_2 \& x0_3)\wedge(x1_0 \& x0_1 \& x1_2 \& x1_3)\wedge(x1_0 \& x0_1 \& x1_2 \& x2_3) (x0 \& x0_1 \& x2_2 \& x0_3)\wedge(x1_0 \& x0_1 \& x2_2 \& x1_3)\wedge(x1_0 \& x1_1 \& x2_2 \& x2_3) \wedge(x1_0 \& x1_1 \& x0_2 \& x0_3)\wedge(x1_0 \& x1_1 \& x0_2 \& x1_3)\wedge(x1_0 \& x1_1 \& x0_2 \& x2_3) \wedge(x1_0 \& x1_1 \& x1_2 \& x0_3)\wedge(x1_0 \& x1_1 \& x1_2 \& x1_3)\wedge(x1_0 \& x1_1 \& x1_2 \& x2_3) \wedge(x1_0 \& x1_1 \& x2_2 \& x0_3)\wedge(x1_0 \& x1_1 \& x2_2 \& x2_3) \wedge(x1_0 \& x2_1 \& x0_2 \&$ $x0_3)\hat{}(x1_0 \& x2_1 \& x0_2 \& x1_3)\hat{}(x1_0 \& x2_1 \& x0_2 \& x2_3) \hat{}(x1_0 \& x2_1 \& x1_2 \& x0_3)\hat{} (x1_0 \& x2_1 \& x1_2 \& x1_3)\hat{}(x1_0 \& x2_1 \& x1_2 \& x2_3) \hat{}(x1_0 \& x2_1 \& x2_2 \& x0_3)\hat{}(x1_0 \& x2_1 \& x2_2 \& x1_3)\hat{}(x1_0 \& x2_1 \& x2_2 \& x2_3) \hat{}(x2_0 \& x0_1 \& x0_2 \& x0_3)\hat{}(x2_0 \& x0_1 \& x0_2 \& x1_3)\hat{}(x2_0 \& x0_1 \& x0_2 \& x2_3) \hat{}(x2_0 \& x0_1 \& x1_2 \& x0_3)\hat{}(x2_0 \& x0_1 \& x1_2 \& x1_3)\hat{}(x2_0 \& x0_1 \& x1_2 \& x2_3) \hat{}(x2_0 \& x0_1 \& x2_2 \& x0_3)\hat{}(x2_0 \& x0_1 \& x2_2 \& x1_3)\hat{}(x2_0 \& x0_1 \& x2_2 \& x2_3) \hat{}(x2_0 \& x1_1 \& x0_2 \& x0_3)\hat{}(x2_0 \& x1_1 \& x0_2 \& x1_3)\hat{}(x2_0 \& x1_1 \& x0_2 \& x2_3) \hat{}(x2_0 \& x1_1 \& x1_2 \& x0_3)\hat{}(x2_0 \& x1_1 \& x1_2 \& x1_3)\hat{}(x2_0 \& x1_1 \& x1_2 \& x2_3) \hat{}(x2_0 \& x1_1 \& x2_2 \& x0_3)\hat{}(x2_0 \& x1_1 \& x2_2 \& x1_3)\hat{}(x2_0 \& x1_1 \& x2_2 \& x2_3) \hat{}(x2_0 \& x2_1 \& x0_2 \& x0_3)\hat{}(x2_0 \& x2_1 \& x0_2 \& x1_3)\hat{}(x2_0 \& x2_1 \& x0_2 \& x2_3) \hat{}(x2_0 \& x2_1 \& x1_2 \& x0_3)\hat{}(x2_0 \& x2_1 \& x1_2 \& x1_3)\hat{}(x2_0 \& x2_1 \& x1_2 \& x2_3) \hat{}(x2_0 \& x2_1 \& x2_2 \& x0_3)\hat{}(x2_0 \& x2_1 \& x2_2 \& x1_3)\hat{}(x2_0 \& x2_1 \& x2_2 \& x2_3)) \& ((x0_4 \& x0_5 \& x0_6 \& x0_7)\hat{}(x0_4 \& x0_5 \& x0_6 \& x1_7)\hat{}(x0_4 \& x0_5 \& x0_6 \& x2_7) \hat{}(x0_4 \& x0_5 \& x1_6 \& x0_7)\hat{}(x0_4 \& x0_5 \& x1_6 \& x2_7) \hat{}(x0_4 \& x0_5 \& x2_6 \& x0_7)\hat{}(x0_4 \& x0_5 \& x2_6 \& x1_7)\hat{}(x0_4 \& x0_5 \& x2_6 \& x2_7) \hat{}(x0_4 \& x1_5 \& x0_6 \& x0_7)\hat{}(x0_4 \& x1_5 \& x0_6 \& x1_7)\hat{}(x0_4 \& x1_5 \& x6 \& x2_7) \hat{}(x0_4 \& x1_5 \& x1_6 \& x0_7)\hat{}(x0_4 \& x1_5 \& x1_6 \& x1_7)\hat{}(x0_4 \& x1_5 \& x1_6 \& x2_7) \hat{}(x0_4 \& x1_5 \& x2_6 \& x0_7)\hat{}(x0_4 \& x1_5 \& x2_6 \& x1_7)\hat{}(x0_4 \& x1_5 \& x2_6 \& x2_7) \hat{}(x0_4 \& x2_5 \& x0_6 \& x1_7)\hat{}(x0_4 \& x2_5 \& x0_6 \& x2_7) \hat{}(x0_4 \& x2_5 \& x1_6 \& x0_7)\hat{}(x0_4 \& x2_5 \& x1_6 \& x1_7)\hat{}(x0_4 \& x2_5 \& x1_6 \& x2_7) \hat{}(x0_4 \& x2_5 \& x2_6 \& x0_7)\hat{}(x0_4 \& x2_5 \& x2_6 \& x1_7)\hat{}(x0_4 \& x2_5 \& x2_6 \& x2_7) \hat{}(x1_4 \& x0_5 \& x0_6 \& x0_7)\hat{}(x1_4 \& x0_5 \& x0_6 \& x1_7)\hat{}(x1_4 \& x0_5 \& x0_6 \& x2_7) \hat{}(x1_4 \& x0_5 \& x1_6 \& x0_7)\hat{}(x1_4 \& x0_5 \& x1_6 \& x1_7)\hat{}(x1_4 \& x0_5 \& x1_6 \& x2_7) \hat{}(x1_4 \& x0_5 \& x2_6 \& x0_7)\hat{}(x1_4 \& x0_5 \& x2_6 \& x2_7) \hat{}(x1_4 \& x1_5 \& x0_6 \& x0_7)\hat{}(x1_4 \& x1_5 \& x0_6 \& x1_7)\hat{}(x1_4 \& x1_5 \& x0_6 \& x2_7) \hat{}(x1_4 \& x1_5 \& x1_6 \& x0_7)\hat{}(x1_4 \& x1_5 \& x1_6 \& x1_7)\hat{} (x1_4 \& x1_5 \& x1_6 \& x2_7) \hat{}(x1_4 \& x1_5 \& x2_6 \& x0_7)\hat{}(x1_4 \& x1_5 \& x2_6 \& x1_7)\hat{}(x1_4 \& x1_5 \& x2_6 \& x2_7) \hat{}(x1_4 \& x2_5 \& x0_6 \& x0_7)\hat{}(x1_4 \& x2_5 \& x0_6 \& x1_7)\hat{}(x1_4 \& x2_5 \& x0_6 \& x2_7) \hat{}(x1_4 \& x2_5 \& x1_6 \& x0_7)\hat{}(x1_4 \& x2_5 \& x1_6 \& x2_7) \hat{}(x1_4 \& x2_5 \& x2_6 \& x0_7)\hat{}(x1_4 \& x2_5 \& x2_6 \& x1_7)\hat{}(x1_4 \& x2_5 \& x2_6 \& x2_7) \hat{}(x2_4 \& x0_5 \& x0_6 \& x0_7)\hat{}(x2_4 \& x0_5 \& x0_6 \& x1_7)\hat{}(x2_4 \& x0_5 \& x0_6 \& x2_7) \hat{}(x2_4 \& x0_5 \& x1_6 \& x0_7)\hat{}(x2_4 \& x0_1 \& x1_6 \& x2_7) \hat{}(x2_4 \& x0_5 \& x2_6 \& x0_7)\hat{}(x2_4 \& x0_5 \& x2_6 \& x2_7) \hat{}(x2_4 \& x1_5 \& x0_6 \& x0_7)\hat{}(x2_4 \& x1_5 \& x0_6 \& x1_7)\hat{}(x2_4 \& x1_5 \& x0_6 \& x2_7) \hat{}(x2_4 \& x1_5 \& x1_6 \& x0_7)\hat{}(x2_4 \& x1_5 \& x1_6 \& x2_7) \hat{}(x2_4 \& x1_5 \& x2_6 \& x0_7)\hat{}(x2_4 \& x1_5 \& x2_6 \& x1_7)\hat{}(x2_4 \& x1_5 \& x2_6 \& x2_7) \hat{}(x2_4 \& x2_5 \& x0_6 \& x0_7)\hat{}(x2_4 \& x2_5 \& x0_6 \& x1_7)\hat{}(x2_4 \& x2_5 \& x0_6 \& x2_7) \hat{}(x2_4 \& x2_5 \& x1_6 \& x0_7)\hat{}(x2_4 \& x2_5 \& x1_6 \& x1_7)\hat{}(x2_4 \& x2_5 \& x1_6 \& x2_7) \hat{}(x2_4 \& x2_5 \& x2_6 \& x0_7)\hat{}(x2_4 \& x2_5 \& x2_6 \& x1_7)\hat{}(x2_4 \& x2_5 \& x2_6 \& x2_7)).$ In order to further improve the security of the method according to the invention, each precomputed table implementing a Dirac function may be stored in two versions: an original version and a complementary version equal to the original version masked with the value 1. For each execution of a Dirac function, the version of the table to be used may be chosen randomly.

More precisely, the method according to the invention may comprise an initialization step, performed previously, comprising computing and storing in a Non Volatile Memory for each Dirac function Delta_0_i to be executed, two binary complemented versions $Mi_0'$, $Mi_1'$ of the precomputed table implementing said Dirac function Delta_0_i, said binary complemented versions of the precomputed table being said precomputed table masked with either 0 or 1 such that $Mi_r'$=Delta_0_i[r](x)=Delta_0_i(x) ^ r with i in {0, 1, 00, 01, 10, 11} and r in {0, 1}.

The value of r may be picked at random from an output of the pseudo random generator of the cryptographic device.

Figure 5:
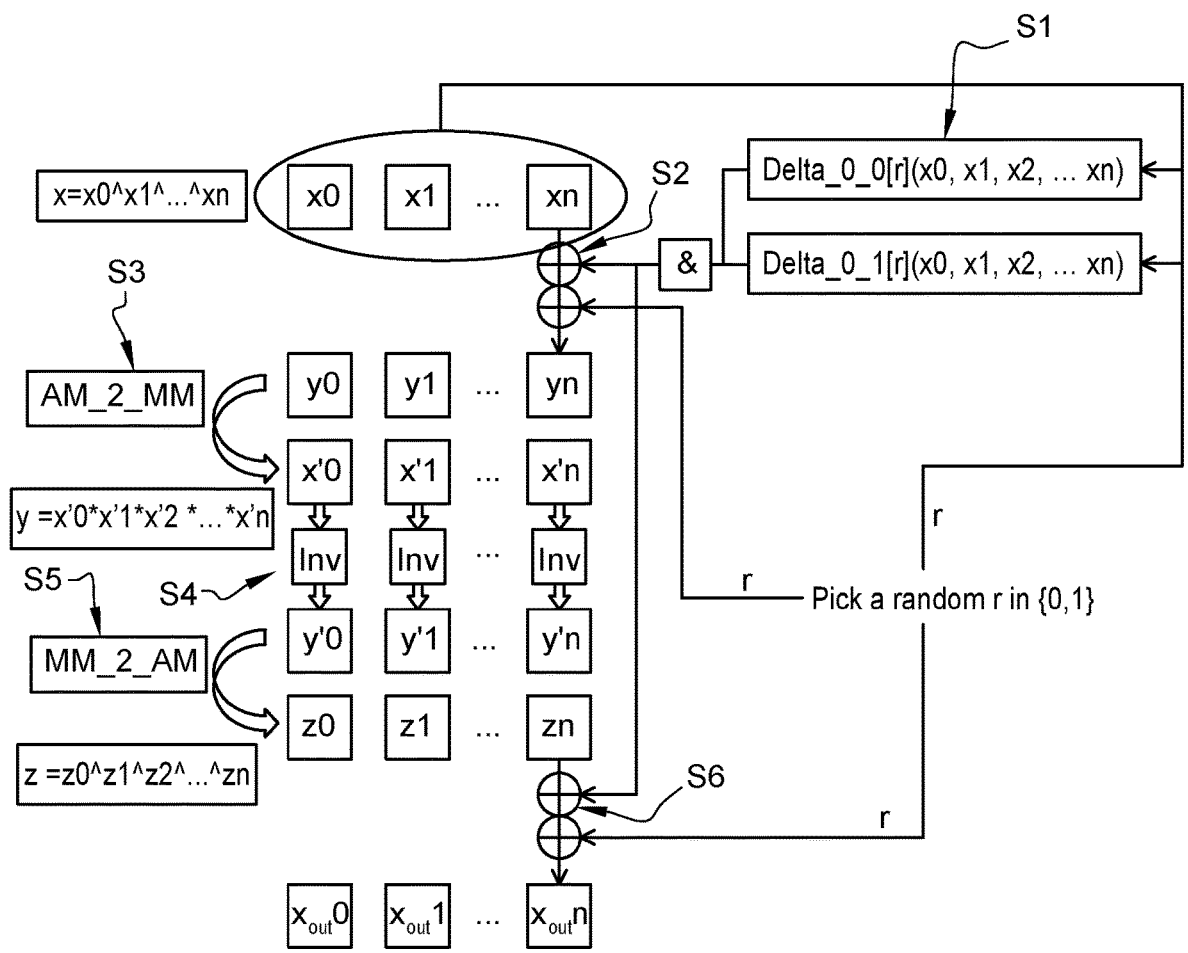
FIG. 5 illustrates schematically a method of securing against n-order side-channel attacks according to an embodiment of the present invention.

In such a case, as shown on FIG. 5, in the first step S1, executing a Dirac function on the shares of the internal state x comprises performing a lookup in one of said two binary complemented versions of the precomputed table implementing said function, depending on a random mask bit.

As shown on FIG. 5, in order not to alter the values of the shares because of such a masking, a XOR between one of the shares and the mask bit r should be performed after the second step S2 and the sixth step S6.

FIG. 5 depicts the case where the Dirac output value is computed according to the third example of implementation provided above. Nevertheless, the same masking of precomputed tables may be applied to any other example of implementation provided above.

As a result, the proposed method enables to reduce the footprint of the protection by splitting during the SubBytes step of AES, particularly by enabling to rely on precomputed tables for the calculation of the Dirac output value Delta_0 (x) while still securing the algorithm against high-order side-channel attacks.

According to a second aspect, this invention therefore relates also to a computer program product directly loadable into the memory of at least one computer, comprising software code instructions for performing the steps of the method according to the first aspect when said product is run on the computer.

According to a third aspect, this invention therefore relates also to a non-transitory computer readable medium storing executable computer code that when executed by a cryptographic device comprising a processing system having at least one hardware processor performs the method according to the first aspect.

According to a fourth aspect, this invention therefore relates also to a cryptographic device as described here above and illustrated in FIG. 2. Such a cryptographic device comprises:
- a processing system having at least one hardware processor 201 configured to execute the steps of the method according to the first aspect,
- at least one Non Volatile Memory 205 and/or a read-only memory 204 configured for storing precomputed tables.

The invention claimed is:

1. A method for securing against high-order side-channel attacks an execution of a SubBytes step of a block cipher algorithm based on Advanced Encryption Standard and operating on an internal state x split into a first set of (n+1) shares (x0, x1, x2 . . . xn) by a (n+1)-additive sharing, with n a non-zero integer, said SubBytes step comprising: a substep of affine transformation in $GF(2^8)$ on the state x and a substep of a field inversion in GF(256)*, wherein said substep of field inversion is performed by a cryptographic device (101) and comprises:

computing (S1) a Dirac output value by executing at least one Dirac function on a plurality of shares xi of the internal state x, with i an integer in [0,n], said Dirac function being a function defined in GF(256) such that said Dirac output value is equal to 1 when x equals 0 and is equal to 0 otherwise;

adding (S2) said Dirac output value to one of said shares of the first set of shares to obtain a second set of shares;

performing a conversion of the second set of shares (S3) from said (n+1) additive sharing to a (n+1)-multiplicative sharing;

performing an inversion of each share of the (n+1)-multiplicative sharing (S4);

performing a conversion of the inverted shares (S5) from said multiplicative sharing to a (n+1)-additive sharing to obtain a third set of shares; and adding (S6) said Dirac output value to one of said shares of the third set of shares and wherein the step of computing the Dirac output value (S1) comprises:

replacing one of the shares xi by its binary complementary ~xi with i an integer in $\{0, 1, \ldots n\}$ and ~ the Boolean negation operation; and performing a XOR between (n+1) binary values, each of said binary values being computed by performing a Boolean conjunction AND operation & between a plurality of bits of said shares having different indexes in said shares, with XOR the Boolean exclusive disjunction operation.

2. The method of claim 1, comprising previously computing and storing in a Non-Volatile Memory the at least one Dirac function implemented as at least one precomputed table, and wherein the step of computing the Dirac output value comprises performing a lookup in said at least one precomputed table implementing said at least one Dirac function.

3. The method of claim 1, wherein computing the Dirac output value (S1) comprises computing Delta_0(x)=XOR (xA$_0$ & xB$_1$ & xC$_2$ & xD$_3$ & xE$_4$ & xF$_5$ & xG$_6$ & XH$_7$), for all possible combinations of A, B, C, D, E, F, G, H in $\{0, 1, \ldots n\}$ with & the Boolean conjunction AND operation.

4. The method of claim 3, comprising previously: computing and storing in a Non Volatile Memory for each Dirac function (Delta_0_i) to be executed, two binary complemented versions ($M_{io}$, $M_{ir}$) of the precomputed table implementing said Dirac function (Delta_0_i), said binary complemented versions of the precomputed table being said precomputed table masked with either 0 or 1; and, wherein executing a Dirac function on the shares of the internal state x comprises performing a lookup in one of said two binary complemented versions of the precomputed table implementing said function depending on a random mask bit.

5. The method of claim 1, wherein computing the Dirac output value (S1) comprises: executing a first Dirac function Delta_0_0 on the shares of the internal state x such that: Delta_0_0(x)=XOR(xA$_0$ & xB$_1$ & xC$_2$ & xD$_3$), for all possible combinations of A, B, C, D in $\{0, 1, \ldots, n\}$; executing a second Dirac function Delta_0_1 on the shares of the internal state x such that: Delta_0_1(x)=XOR(xA$_4$ & xB$_5$ & xC$_6$ & xD$_7$), for all possible combinations of A, B, C, D in $\{0, 1, \ldots, n\}$; and performing a Boolean conjunction AND operation & between the results of the execution of the first Dirac function and of the second Dirac function Delta_0_0(x) & Delta_0_1(x).

6. The method of claim 1, wherein computing the Dirac output value (S1) comprises: executing a first Dirac function Delta_0_00 on the shares of the internal state x such that: Delta_0_00(x)=XOR (xA$_0$ & xB$_1$), for all possible combinations of A, B in $\{0, 1, \ldots, n\}$; executing a second Dirac function Delta_0_01 on the shares of the internal state x such that: Delta_0_1(x)=XOR (xC$_2$ & xD$_3$), for all possible combinations of A, B, C, D in $\{0, 1, \ldots, n\}$; executing a third Dirac function Delta_0'_10 on the shares of the internal state x such that: Delta_0_10(x)=XOR (xA$_4$ & xB$_5$), for all possible combinations of A, B in $\{0, 1, \ldots, n\}$; executing a fourth Dirac function Delta_0_11 on the shares of the internal state x such that: Delta_0_11(x)=XOR (xC$_6$ & xD$_7$), for all possible combinations of C, D in $\{0, 1, \ldots, n\}$; and performing a Boolean conjunction AND operation & between the results of the execution of the first Dirac function, of the second Dirac function, of the third Dirac function and of the fourth Dirac function: Delta_0(x)= Delta_0_00(x) & Delta_0_01(x) & Delta_0_10(x) & Delta_0_11(x).

* * * * *